US010106467B1

(12) United States Patent
Xie

(10) Patent No.: US 10,106,467 B1
(45) Date of Patent: Oct. 23, 2018

(54) METHOD AND APPARATUS FOR MANUFACTURING QUARTZ SLAB

(71) Applicant: Alex Xie, West Windsor, NJ (US)

(72) Inventor: Alex Xie, West Windsor, NJ (US)

( * ) Notice: Subject to any disclaimer, the term of this patent is extended or adjusted under 35 U.S.C. 154(b) by 0 days.

(21) Appl. No.: 16/018,968

(22) Filed: Jun. 26, 2018

Related U.S. Application Data

(62) Division of application No. 15/854,519, filed on Dec. 26, 2017, now Pat. No. 10,035,733.

(51) Int. Cl.
| | |
|---|---|
| *B44F 9/04* | (2006.01) |
| *B29C 39/02* | (2006.01) |
| *B29C 39/24* | (2006.01) |
| *B29C 39/44* | (2006.01) |
| *C04B 40/00* | (2006.01) |
| *C04B 35/14* | (2006.01) |
| *C04B 35/622* | (2006.01) |
| *B65G 47/62* | (2006.01) |
| *B65G 47/18* | (2006.01) |
| *B65G 41/00* | (2006.01) |
| *C04B 111/54* | (2006.01) |
| *B29D 99/00* | (2010.01) |

(52) U.S. Cl.
CPC ........ *C04B 40/0032* (2013.01); *B29C 39/023* (2013.01); *B29C 39/24* (2013.01); *B29C 39/44* (2013.01); *B44F 9/04* (2013.01); *B65G 41/003* (2013.01); *B65G 47/18* (2013.01); *B65G 47/62* (2013.01); *C04B 35/14* (2013.01); *C04B 35/622* (2013.01); *B29D 99/0039* (2013.01); *B65G 2201/042* (2013.01); *B65G 2812/12* (2013.01); *C04B 2111/542* (2013.01)

(58) Field of Classification Search
None
See application file for complete search history.

(56) References Cited

U.S. PATENT DOCUMENTS

| | | | |
|---|---|---|---|
| 1,597,103 | A | 8/1926 | Oberherr |
| 1,735,674 | A | 11/1929 | Copeland |
| 1,935,985 | A | 11/1933 | Oberherr |
| 1,949,517 | A | 3/1934 | Van Der Pyl |
| 2,044,585 | A | 6/1936 | Macht |
| 2,140,197 | A | 12/1938 | Batcheller |
| 3,088,713 | A | 5/1963 | Gard |
| 3,318,984 | A | 5/1967 | Dussel |

(Continued)

FOREIGN PATENT DOCUMENTS

FR 002627424 A1 8/1989

*Primary Examiner* — Mary Lynn F Theisen
(74) *Attorney, Agent, or Firm* — Walter J. Tencza, Jr.

(57) ABSTRACT

An apparatus including a first conveyor device including a first conveyor belt; a second conveyor device including a second conveyor belt; a movement device; and a mold device including a mold; wherein the first conveyor device is connected to the second conveyor device so that when the movement device moves the first conveyor device, the second conveyor device also moves with respect to the mold device; wherein the first conveyor belt moves independent of the second conveyor belt; and wherein the first conveyor belt and the second conveyor belt move independent from the movement device. The apparatus may further include a first and second dispensing devices configured to dispense first and second materials, first and second gate devices to control height, and a computer processor to control the various components and the resulting ratio of first material to second material in a processed slab.

14 Claims, 7 Drawing Sheets

(56) References Cited

U.S. PATENT DOCUMENTS

| | | |
|---|---|---|
| 4,013,616 A | 3/1977 | Wallace |
| 4,209,486 A | 6/1980 | Ross |
| 4,343,752 A | 8/1982 | Cann |
| 5,266,253 A | 11/1993 | Dijkhuizen |
| 5,795,513 A | 8/1998 | Austin |
| 5,885,503 A | 3/1999 | Bordener |
| 6,517,915 B1 | 2/2003 | Banus |
| 6,702,967 B2 | 3/2004 | Overholt et al. |
| 8,436,075 B2 | 5/2013 | Buskila et al. |
| 8,702,886 B2 | 4/2014 | Yaniv et al. |
| 9,186,819 B1 | 11/2015 | Grzeskowiak, II |
| 9,511,516 B2 | 12/2016 | Xie |
| 9,707,698 B1 | 7/2017 | Xie |
| 9,718,303 B2 | 8/2017 | Greskowiak, II et al. |
| 2004/0175514 A1 | 9/2004 | Stiattesi |
| 2006/0101752 A1 | 5/2006 | Sakai |
| 2012/0283384 A1 | 11/2012 | Cox |
| 2014/0127450 A1 | 5/2014 | Riman |
| 2016/0236984 A1 | 8/2016 | Riman |

METHOD AND APPARATUS FOR MANUFACTURING QUARTZ SLAB

CROSS REFERENCE TO RELATED APPLICATION(S)

The present application is a divisional of and claims the priority of U.S. patent application Ser. No. 15/854,519, titled "METHOD AND APPARATUS FOR MANUFACTURING QUARTZ SLAB", filed on Dec. 26, 2017.

FIELD OF THE INVENTION

This invention relates to improved methods and apparatus concerning quartz slabs.

BACKGROUND OF THE INVENTION

Quartz is the second most abundant mineral in the Earth's crust and one of the hardest naturally occurring materials. One of its many uses is in "engineered stone". Engineered stone, including quartz, has become a common surfacing and countertop choice in many countries throughout the world. Its applications include kitchen and bathroom countertops, tables and desktops, floor tile, food service areas, wall cladding, and various other horizontal and vertical applications.

The production of engineered stone generally involves particulate materials such as ground quartz rock, crushed glass, rocks, pebbles, sand, shells, silicon, and other inorganic materials combined with polymers, binders, resins, colorants, dyes, etc. The particulate material(s) may be varying sizes ranging from four hundred mesh particle size to four mesh particle size with multiple materials of different sizes used simultaneously. The polymer may include agents to such as a binder, hardener, initiator, or combination of such. The particulate material(s) and polymers, binders, resins, colorants, dyes, etc. are then mixed resulting in a slightly damp mixture. This initial mixture may be processed through a crushing machine to reduce the size of the combined particles. The resultant, finer mixture may be poured into a supporting mold, tray, or other supporting structure, after that, the slab is moved into a vacuumed press machine to be pressed, and then, moved into a curing machine to be cured into a hardened quartz slab. After curing, the slab is generally moved in a grinder to be grinded to a desired thickness, followed by a polisher to finish the product.

Quartz based stone has many advantages over natural stone such as marble and granite. Compared to these natural stones quartz is harder, stronger, less water absorbent, and more resistant to staining, scratching, breakage, chemicals, and heat. One of the drawbacks of quartz is its perceived lack of natural, random looking veins and color patterns compared with natural stones. This invention addresses a method of producing a quartz based slab with single color patterns or multiple color patterns and/or veins.

SUMMARY OF THE INVENTION

In at least one embodiment, an apparatus is provided comprising a first conveyor device including a first conveyor belt; a second conveyor device including a second conveyor belt; a movement device; and a mold device including a mold; wherein the first conveyor device is connected to the second conveyor device so that when the movement device moves the first conveyor device, the second conveyor device also moves with respect to the mold device; wherein the first conveyor belt moves independent of the second conveyor belt; and wherein the first conveyor belt and the second conveyor belt move independent from the movement device.

In at least one embodiment the apparatus may further include a first dispensing device configured to dispense a first material onto the first conveyor belt; and a second dispensing device configured to dispense a second material onto the second conveyor belt; wherein the second conveyor belt drops the second material onto the first conveyor belt to mix the first material with the second material; and wherein the first conveyor belt is configured with respect to the mold device so that the mixture of the first material and the second material is dropped into the mold of the mold device.

The apparatus may further include a first gate device which is connected to the first conveyor device, and which controls a height of the first material provided from the first conveyor belt; and a second gate device which is connected to the second conveyor device, and which controls a height of the second material provided from the second conveyor belt.

A computer processor may be provided which may control the first conveyor device, the second conveyor device, the first gate device, the second gate device, the first dispensing device and the second dispensing device.

The computer processor, may be programmed, such as by a program in computer memory, to control the contents of a combination of materials which includes a first material provided by the first conveyor device and a second material provided by the second conveyor device, so that the combination of materials has a continuously varying ratio of the first material to the second material as the combination of materials is dropped into the mold of the mold device.

In at least one embodiment, a processed slab, may be provided which may include a major surface at least two feet wide by at least six feet long and extending perpendicularly to a slab thickness; wherein the processed slab includes at least one vein of a combination of materials; wherein the at least one vein extends generally lengthwise from a first edge of the processed slab to an opposing second edge; wherein the at least one vein has a thickness equal to and parallel to the slab thickness; wherein the at least one vein has a combination of materials which includes at least a first material and a second material; and wherein a ratio of the first material to the second material continuously varies over a height of the at least one vein. The ratio may also continuously vary over the thickness and the length of the at least one vein.

In at least one embodiment, a method is provided which includes using a computer processor, to control contents of a combination of materials which includes a first material provided by a first conveyor device and a second material provided by a second conveyor device, so that the combination of materials has a predetermined ratio of the first material to the second material as the combination of materials is dropped into a mold of a mold device. The method may employ the apparatus as previously described.

The computer processor, may be programmed to control the contents of a combination of materials which includes the first material provided by the first conveyor device and a second material provided by the second conveyor device, so that the combination of materials has a continuously varying ratio of the first material to the second material as the combination of materials is dropped into the mold of the mold device. The combination of materials may be continuously varied over height, length, and width, of a mold, which results in a continuously varied slab.

DETAILED DESCRIPTION OF THE DRAWINGS

Figure 1:
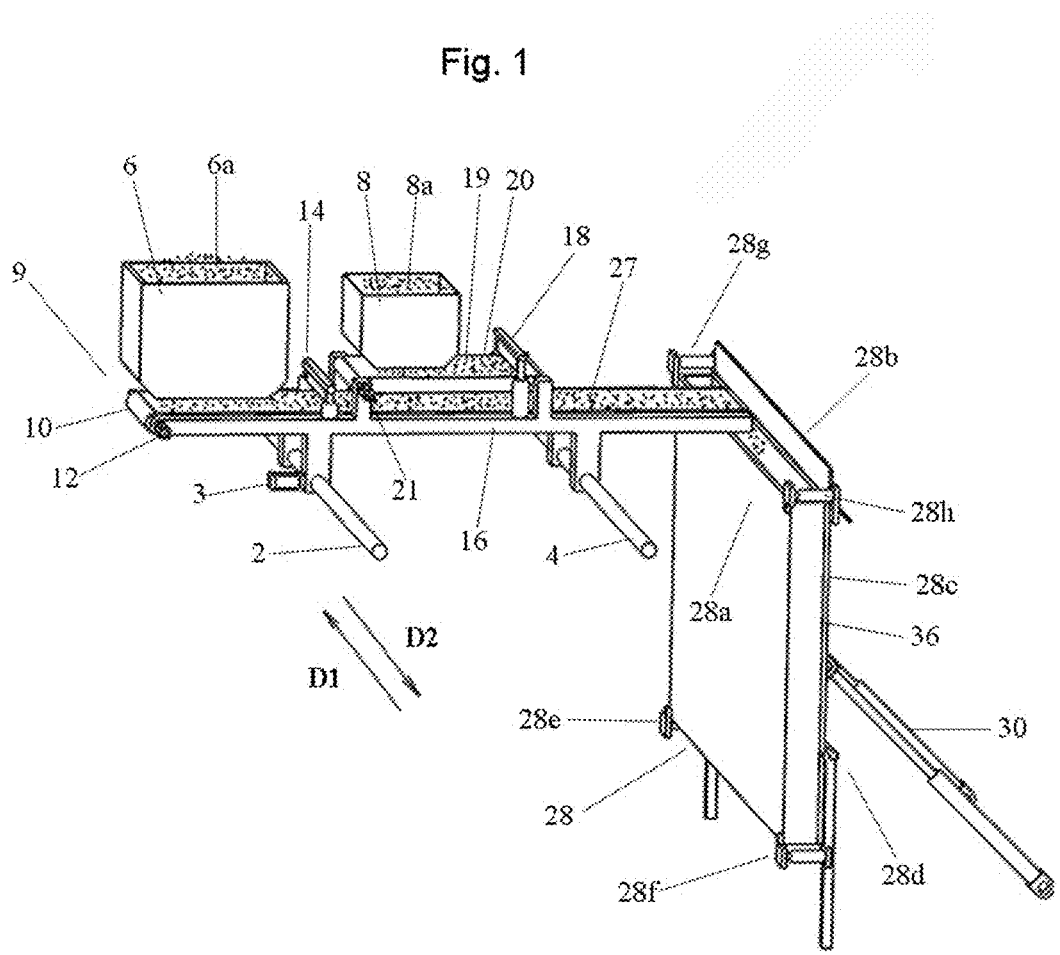
FIG. 1 is a simplified perspective view of an apparatus in accordance with an embodiment of the present invention.

FIG. 1 is a simplified perspective view of an apparatus 1 in accordance with an embodiment of the present invention.

Figure 2:
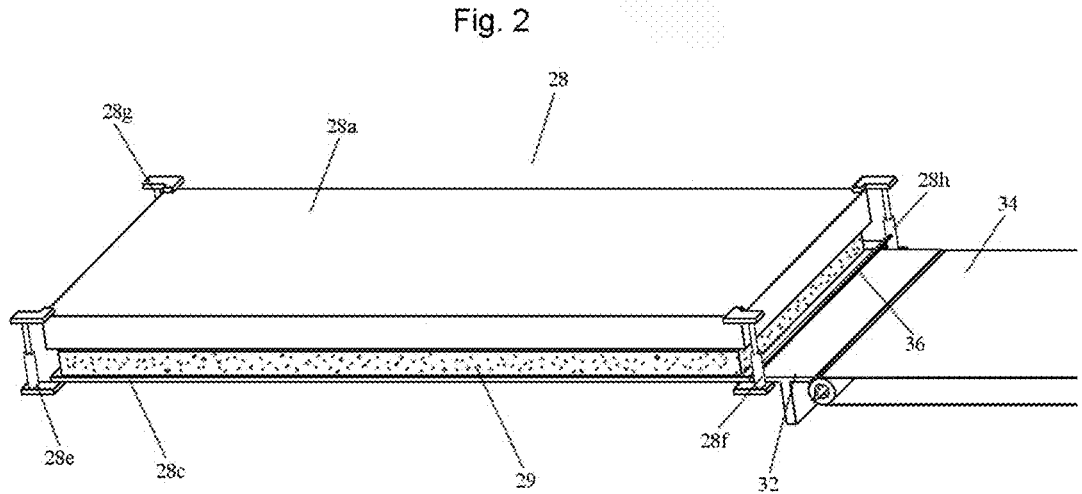
FIG. 2 shows a perspective view of a mold in horizontal position with a mold cover of the apparatus of FIG. 1 raised.

FIG. 2 shows a perspective view of a mold in horizontal position with a mold cover of a mold structure 28 of the apparatus 1 of FIG. 1, raised.

Figure 3:
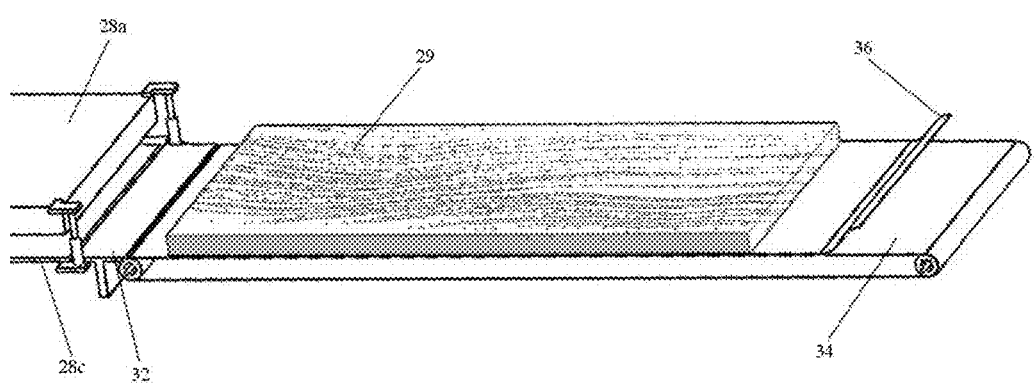
FIG. 3 shows a perspective view of a finished quartz slab moved out from under the mold cover of the apparatus of FIG. 1.

FIG. 3 shows a perspective view of a finished quartz slab 29 moved out of the horizontal positioned mold 28.

Figure 4:
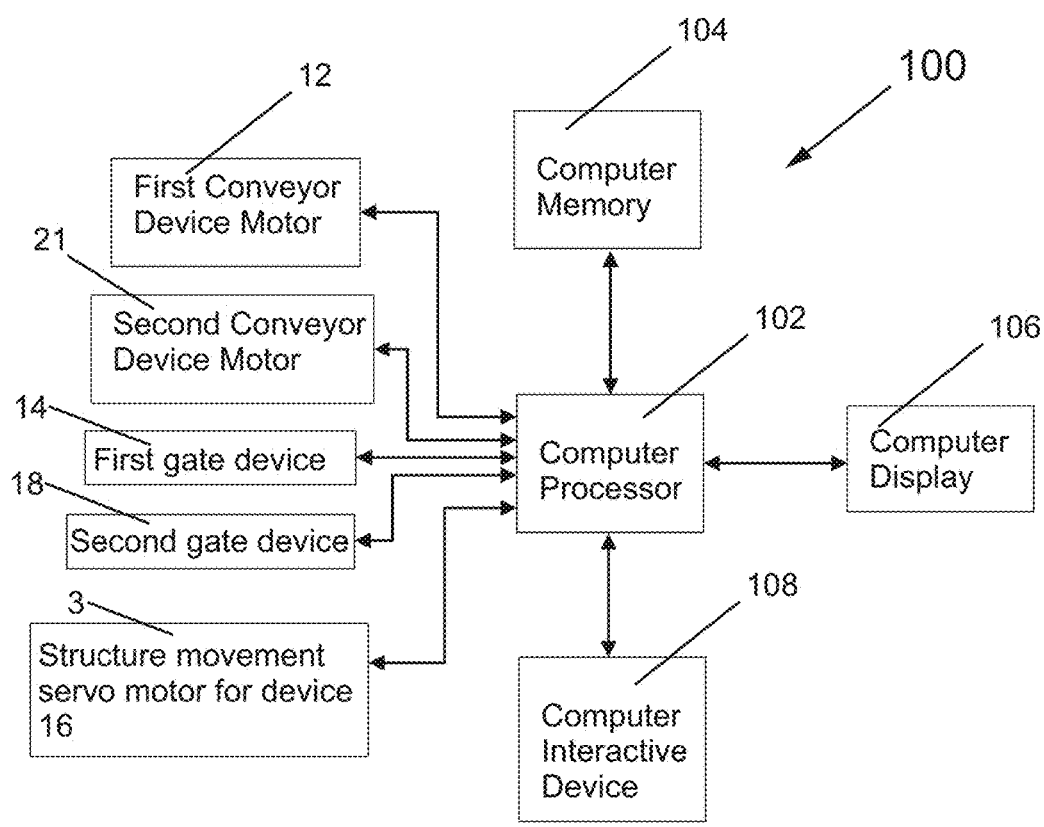
FIG. 4 shows a block diagram of components for controlling the apparatus of FIG. 1.

FIG. 4 shows a block diagram 100 of components for controlling the apparatus 1 of FIG. 1.

Figure 5:
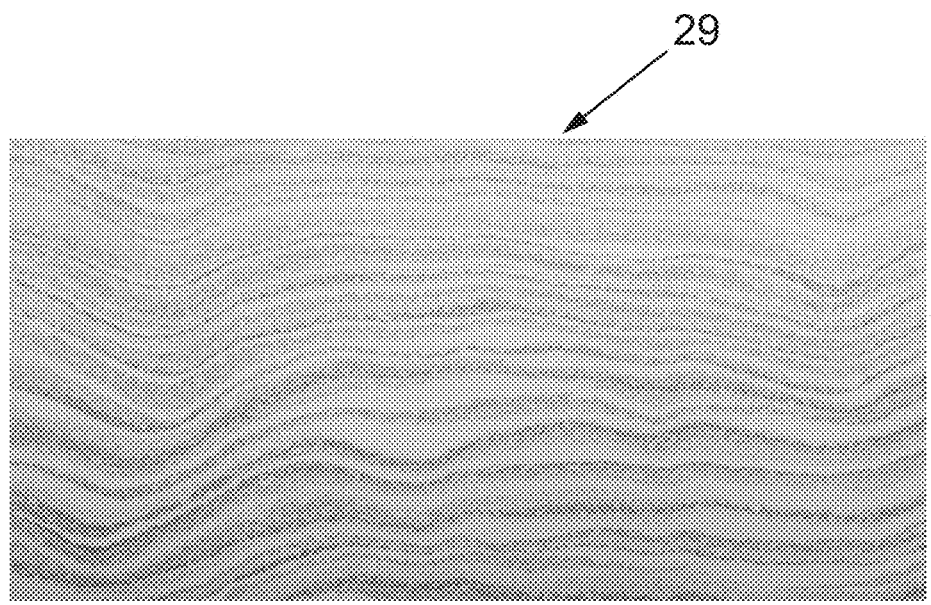
FIG. 5 shows a top view of the finished quartz slab of FIG. 3.

FIG. 5 shows a top view of the final processed, cured, grinded and polished quartz slab 29 of FIG. 3.

Referring to FIG. 1, in at least one embodiment, the apparatus 1 includes tracks 2 and 4 which are parallel to each other. The apparatus 1 also includes dispensing devices or hoppers 6 and 8, first conveyor device 9, first gate device 14, second gate device 18, movement structure device 16, second conveyor device 19, mold structure 28, which includes mold cover 28a, mold gate 28b, mold back plate 28c, mold cover pistons 28e, 28f, 28g, 28h, mold pivot 28d, and a mold rotating hydraulic device 30. The structure device 16 may include a servo motor 3 which can drive the structure device 16 to move in the directions D1 and D2.

The first conveyor device 9 includes belt 10, and servo motor 12. The second conveyor device 19 includes belt 20, and servo motor 21.

The dispensing device or hopper 6 may have located therein a base quartz material 6a. The dispensing device or hopper 8 may have located therein a first color quartz material which is different from the base quartz material 6a. The material 6a and the material 8a may differ in color and in other aspects. The mold structure 28 may have a mold cover 28a, a mold gate 28b, mold cover raise/drop piston devices 28c, 28d, 28e, 28f, and mold back plate 28c.

Referring to FIG. 2, the mold structure 28 in horizontal position, with mold cover 28a raised, formed quartz mixture 29 on top of a backing paper 36, which is on top of the mold back plate 28c, ready to be pulled past a junction plate 32, onto the main conveyor belt 34 for further processing. When mold structure 28 is in the horizontal position, the upper surface of the back plate 28c, the upper surface of the junction plate 32 and upper surface of the main conveyor belt 34 are all flush on the same plane.

FIG. 3 shows a formed quartz mixture slab 29 that has been pulled onto the main conveyor belt 34.

Referring to FIG. 4, the diagram 100, shows a computer processor 102, a computer memory 104, a computer display 106, a computer interactive device 108 (such as a computer mouse, touchscreen, or computer keyboard), and in simplified block diagram form, the first conveyor device servo motor 12, the second conveyor device servo motor 21, the structure movement servo motor 3 for device 16, the first gate device 14, the second gate device 18. The components 104, 106, 108, 12, 21, 14, 18, and 3 are in communication with the computer processor 102.

In operation, the computer processor 102 is programmed by computer software stored in the computer memory 104, and/or controlled by the computer interactive device 108 to control the components 3, 12, 21, 14, and 18. In one or more embodiments, the height of the gate devices 14 and 18 may also be adjusted by hand. In one or more embodiments, the base quartz material 6a and first color quartz material 8a may be dropped into the vertically positioned mold 28 by hand in order to simulate the computer controlled actions.

The crushed base quartz material 6a is delivered into the dispensing device or hopper 6 and then is dropped through the bottom of the hopper 6 onto the belt 10 of the first conveyor device 9. The crushed first color quartz material 8a is delivered into the dispensing device or hopper 8 and then is dropped through the bottom of the hopper 8 onto the belt 20 of the second conveyor device 19. The belt 10, of the first conveyor device 9, moves in response to servo motor 12, which moves in response to the computer processor 102 to move the base quartz material 6a towards the opening of the mold 28, and then drops it into the vertically positioned mold 28. The belt 20, of the second conveyor device 19, moves in response to servo motor 21, which moves in response to the computer processor 102 to move the first color quartz material 8a towards the belt 10 of the first conveyor device 9.

The second conveyor device 19, in at least one embodiment, is fixed to the movement and support device 16, so that the second conveyor device 19 is above a portion of the first conveyor device 9. The first conveyor device 9, the movement structure device 16, and the second conveyor device 19 are fixed to each other and when the movement structure device 16 moves in the directions D1 and D2 along the tracks 2 and 4, driven by servo motor 3, controlled by computer processor 102, the first conveyor device 9 and the second conveyor device 19, also move, but remain fixed with respect to each other and with respect to the movement and support device 16. In this manner, the devices 9, 16, and 19 can be moved in the directions D1 and D2, to allow a mixture of material 6a and 8a to be delivered to different locations into the opening of the vertically positioned mold 28, along the lengths of the mold 28.

In operation, the material 8a is moved by belt 20 and dropped and mixed in with material 6a on the belt 10, in order to provide a mixture of material 6a and 8a on the belt 10. This mixture of material 6a and 8a is then dropped into the vertically positioned mold 28 through the top opening of the mold 28.

The percentage of the base quartz material 6a and the percentage of the first color quartz material 8a to form a mixture, is controlled by the computer processor 102, control the moving speed of the belt 10 and the belt 20, through servo motors 12 and 21. The specific combination of base quartz material 6a and first color quartz material 8a can be dropped at a certain position along the length of the top opening of mold 28, while the structure 16 is moved along the directions D1 and D2. For example, if a mixture with a composition of 95% base quartz material 6a and 5% color quartz material 8a mixture is desired at a specific location in mold 28, 5% of the first color quartz 8a can be placed on top of 95% quartz material 6a through control of the computer 102, and dropped into the mold 28. The base quartz material 6a and the first color quartz 8a will be further randomly mixed during the free fall from the drop.

In addition, the computer processor 102 may be programmed to gradually change the percentage of each color between each layer of dropped mixture in the mold, and a non-distinct, gradient of color between layers in the mold can be achieved. If the servo motor 12 and the servo motor 21 maintain a fixed speed during the distribution of certain layer of the mixture 6a and 8a into the mold 28, by raising the speed of the servo motor 3 while moving in D1/D2 direction, a thinner layer of the mixture in the mold 28 will be obtained. In addition, by increasing the speed of servo motor 12 and/or increasing the speed of the servo motor 21 while serve motor 3 is maintained at a fixed speed, a thicker layer of the quartz mixture 6a and 8a in the mold 28 will be obtained.

If servo motors 12 and 21 maintain a fixed speed, by varying the speed of servo motor 3 as structure device 16 moves along the top opening of the mold 28, in directions D1/D2, in the FIG. 1, more material may be deposited in one region versus another in certain layer of the mold 28, and alternating thicker and thinner layers of the quartz mixture will occur in the mold 28, creating a waved layer result in the mold 28, in accordance with one or more embodiments.

By programming the computer processor 102 to adjust the speeds of server motor 3, server motor 12 and server motor 21, at any given time point, a desired pattern of layers of a quartz slab can be obtained.

After depositing the mixed material 6a and 8a into the mold 28, the mold gate 28b can be closed and then the mold 28 can be rotated from its vertical position to a horizontal one, driven by the hydraulic device 30. Once the mold 28 is in the horizontal position the mold cover 28a can be raised by piston 28e, 28f, 28g, 28h, and the processed quartz mixture can by pulled by grabbing the backing paper 36 onto the main conveyor belt 34 and then sent for further processed such as disclosed in U.S. Pat. No. 9,511,516, to Xie, which is incorporated by reference herein.

Figure 6:
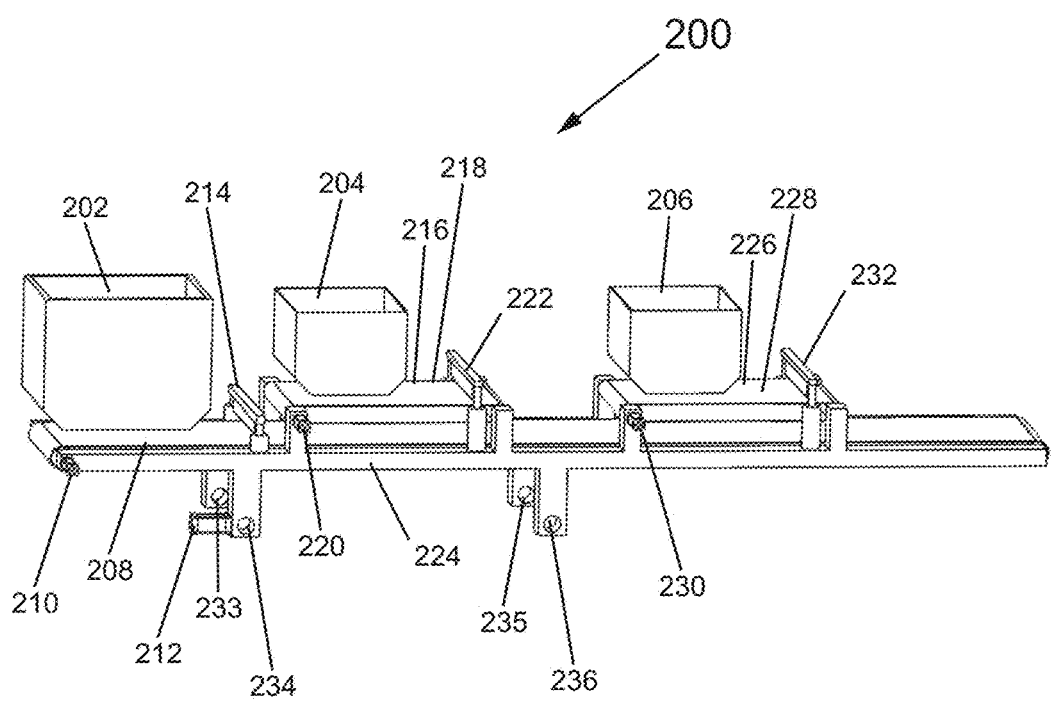
FIG. 6 is a simplified perspective view of another apparatus in accordance with another embodiment of the present invention.

FIG. 6 is a simplified perspective view of an apparatus 200 in accordance with another embodiment of the present invention. The apparatus 200 has similar components to the apparatus 1, but the apparatus 200 has a second colored quartz dispensing device 206, hopper gate 232, and belt 228, in order to have three color blends.

The apparatus 200 includes dispensing devices 202, 204, and 206. The dispensing devices 202 and 204 may be identical to the devices 6 and 8 shown in FIG. 1. The dispensing device 206 may be identical to the dispensing device 204. The apparatus 200 further includes belt 208, servo motor 210, servo motor 212, conveyor device 216, belt 218, servo motor 220, gate 222, movable structure 224, conveyor device 226, belt 228, servo motor 230, gate 232, pair of openings 233 and 234 for a rail similar or identical to rail or track 2 in FIG. 1, and pair of openings 235 and 236 for a rail similar or identical to rail or track 4 in FIG. 1.

The servo motor 212 may be similar or identical to the servo motor 3 in FIG. 1. The servo motor 3 may be used for moving the structure 224, similar or identical to the manner in which motor 3 moves the structure 16 in FIG. 1. The apparatus 200 may be controlled in a similar or identical manner to the apparatus 1, using the computer processor 102 to control servo motors 210, 212, 220, and 230, as for motors 12, 21, and 3, with the addition of motor 230 for the second color dispensing device 206, and related components. The computer processor 102 may also control the raising and lowering of gates 222 and 232, or those gates may be raised or lowered with respect to the belts 218 and 228, respectively, by hand. The gates 14, 18, 214, 222 and 232 may be oriented perpendicular or substantially perpendicular to the belts 10, 20, 208, 218 and 228 respectively.

Except for the addition of the extra color component, the apparatus 200 may substantially or identically function as the apparatus 1 in other respect.

In at least one embodiment of the present invention, a method is provided which includes orienting the mold structure 28 in the vertical position shown in FIG. 1 to receive material. Thereafter, the method may include depositing material into the mold structure 28 through a top opening such as either via the stacked conveyor belts apparatus shown in FIG. 1 or in an independent conveyor belts apparatus, such as shown in U.S. Pat. No. 9,511,516, which is incorporated herein by reference. Thereafter, the method may include closing a lid on the top of the mold structure 28, to close the top opening, rotating the mold structure 28 into a horizontal orientation as shown in FIG. 2; raising the cover 28a to the mold structure 28 to separate it from the combination material, and then removing the combination material from the mold 28 for further processing.

In at least one embodiment, the computer processor 102 may be programmed to control the contents of a combination of materials which includes a first material provided by the first conveyor device 9 and a second material provided by the second conveyor device 19, so that the combination of materials has a continuously varying ratio of the first material to the second material as the combination of materials is dropped into the mold 28 of the mold device. Thereby, the computer processor 102 can form a processed slab, such as a processed slab having a major surface at least two feet wide by at least six feet long and extending perpendicularly to a slab thickness; wherein the processed slab includes at least one vein of a combination of materials; wherein the at least one vein extends generally lengthwise from a first edge of the processed slab to an opposing second edge; wherein the at least one vein has a thickness equal to and parallel to the slab thickness; and wherein the at least one vein has a combination of materials which includes at least a first material and a second material; and wherein a ratio of the first material to the second material continuously varies over a height of the at least one vein.

Figure 7:
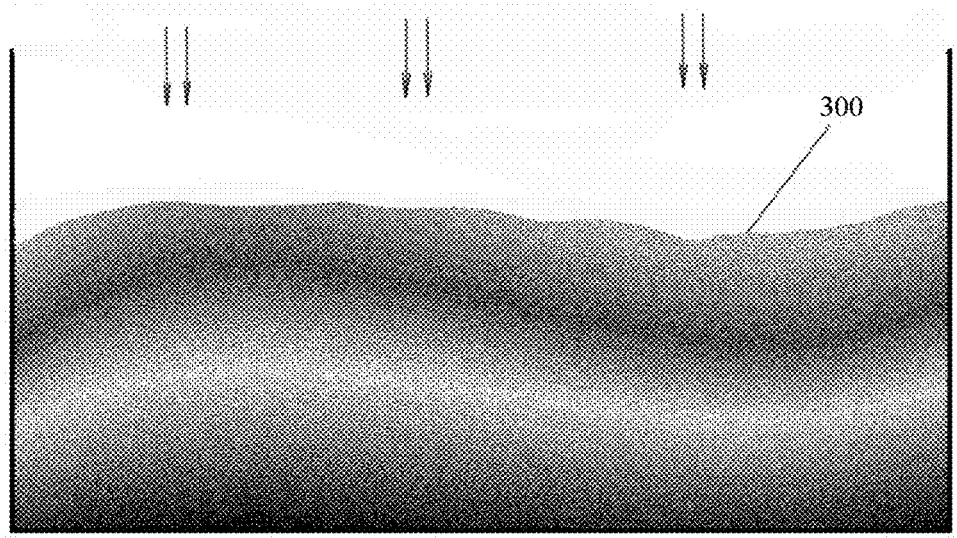
FIG. 7 shows a simplified diagram of a slab with continuous variation of ratio of one material to another.

FIG. 7 shows a simplified diagram of a slab 300 with continuous variation of ratio of a first material to a second material. The first material may be shown by a white color and the second material by a black color, and the various shades of gray show the continuous varying of the ratio of the two materials.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising
supplying a first material to a first conveyor device;
supplying a second material, which is different from the first material, to a second conveyor device;

supplying the second material from the second conveyor device to the first conveyor device to cause mixing of the first material and the second material;

and wherein the first conveyor device is connected to the second conveyor device;

and further comprising moving a combination of the first conveyor device and the second conveyor device to cause a combination of the first material and the second material to be supplied to different locations of a mold.

2. The method of claim 1
wherein the first conveyor device includes a first conveyor belt;
wherein the second conveyor device includes a second conveyor belt;
wherein the first conveyor belt moves independent of the second conveyor belt; and
wherein the combination of the first conveyor device and the second conveyor device is moved independent of movement of the first conveyor belt and independent of movement of the second conveyor belt.

3. The method of claim 1
wherein the first material is supplied to the first conveyor device by being dropped onto a first conveyor belt of the first conveyor device;
wherein the second material is supplied to the second conveyor device by being dropped onto a second conveyor belt of the second conveyor device; and
wherein the combination of the first material and the second material is supplied to different locations of the mold by being dropped into the mold.

4. The method of claim 1 further comprising
controlling a speed of the first conveyor belt;
controlling a speed of the second conveyor belt; and
controlling a speed of movement of the combination of the first conveyor device and the second conveyor device.

5. The method of claim 4 further comprising
using a computer processor to control the speed of the first conveyor belt, the speed of the second conveyor belt, and the speed of movement of the combination of the first conveyor device and the second conveyor device.

6. The method of claim 1 further comprising
using a first gate device, which is connected to the first conveyor device, to control a height of the first material prior to the first material mixing with the second material; and
using a second gate device, which is connected to the second conveyor device, to control a height of the second material prior to the first material mixing with the second material.

7. The method of claim 1 wherein
the combination of the first material and the second material are supplied to different locations of the mold to form a processed slab;
wherein the processed slab comprises a major surface at least two feet wide by at least six feet long and extending perpendicularly to a slab thickness;
wherein the processed slab includes at least one vein of a combination of materials;
wherein the at least one vein extends generally lengthwise from a first edge of the processed slab to an opposing second edge;
wherein the at least one vein has a thickness equal to and parallel to the slab thickness; and
wherein the at least one vein has a combination of materials which includes at least the first material and the second material; and
wherein a ratio of the first material to the second material continuously varies over a height of the at least one vein.

8. The method of claim 1 wherein
the first material is supplied, the second material is supplied, the first material and the second material are mixed to form the combination of the first material and the second material, and the combination of the first material and the second material are supplied to different locations of the mold using a computer processor, so that the combination of the first material and the second material has a predetermined ratio of the first material to the second material as the combination of the first material and the second material is dropped into the mold.

9. The method of claim 6 further comprising
using a computer processor to control the first conveyor device, the second conveyor device, the first gate device, and the second gate device.

10. The method of claim 9 wherein
the computer processor controls a speed of a first conveyor belt of the first conveyor device, a speed of a second conveyor belt of the second conveyor device, a height of the first gate device, and a height of the second gate device.

11. The method of claim 1 wherein
using a computer processor to control contents of the combination of the first material the the second material, so that the combination of the first material and the second material has a continuously varying ratio of the first material to the second material as the combination of materials is dropped into the mold.

12. The method of claim 2 wherein
the first conveyor belt is configured to move in substantially the same direction as the second conveyor belt.

13. The method of claim 12 wherein
the combination of the first conveyor device and the second conveyor device is configured to move in a direction which is substantially perpendicular to the direction of movement of the first conveyor belt and the conveyor belt.

14. A method comprising
supplying a first material to a first conveyor device;
supplying a second material, which is different from the first material, to a second conveyor device;
mixing the first material from the first conveyor device with the second material from the second conveyor device to form a first mixture;
and moving the first mixture along a length of the opening of the mold, before supplying the first mixture to the mold through the opening of the mold; and
wherein the opening of the mold has a width, with the length of the mold being substantially greater than the width of the mold.

* * * * *